US006923943B2

(12) United States Patent
Mazurets et al.

(10) Patent No.: US 6,923,943 B2
(45) Date of Patent: Aug. 2, 2005

(54) EXHAUST CATALYTIC CONVERTER/MUFFLER

(76) Inventors: Leon Mazurets, 19 Ballaslane, Piscataway, NJ (US) 08854; Mark Lew Mazurets, 1050 George St., APT 18J, New Brunswick, NJ (US) 08901

( * ) Notice: Subject to any disclaimer, the term of this patent is extended or adjusted under 35 U.S.C. 154(b) by 410 days.

(21) Appl. No.: 10/096,141

(22) Filed: Mar. 12, 2002

(65) Prior Publication Data

US 2003/0175178 A1 Sep. 18, 2003

(51) Int. Cl.[7] .............................................. B01D 53/34
(52) U.S. Cl. ...................................... 422/180; 422/177
(58) Field of Search ................................ 422/171, 177, 422/180; 428/116, 593, 594; 181/264

(56) References Cited

U.S. PATENT DOCUMENTS

| 938,101 | A | * | 10/1909 | Winters ....................... 181/264 |
| 3,492,098 | A | * | 1/1970 | De Palma et al. .......... 422/180 |
| 3,912,459 | A | * | 10/1975 | Kearsley ..................... 422/179 |
| 4,278,639 | A | * | 7/1981 | Tadokoro et al. ........... 422/171 |
| 4,372,421 | A | * | 2/1983 | Jackson ....................... 181/243 |
| 4,530,418 | A | * | 7/1985 | Currie ......................... 422/180 |

* cited by examiner

Primary Examiner—Hien Tran

(57) ABSTRACT

A catalytic converter assembly, for use in the exhaust systems of vehicles or machinery using internal combustion engines, consisting of a square tube, with perforated rectangular baffles made from common sheet metal of stainleessteel, folded at angles, affixed within it.

2 Claims, 1 Drawing Sheet

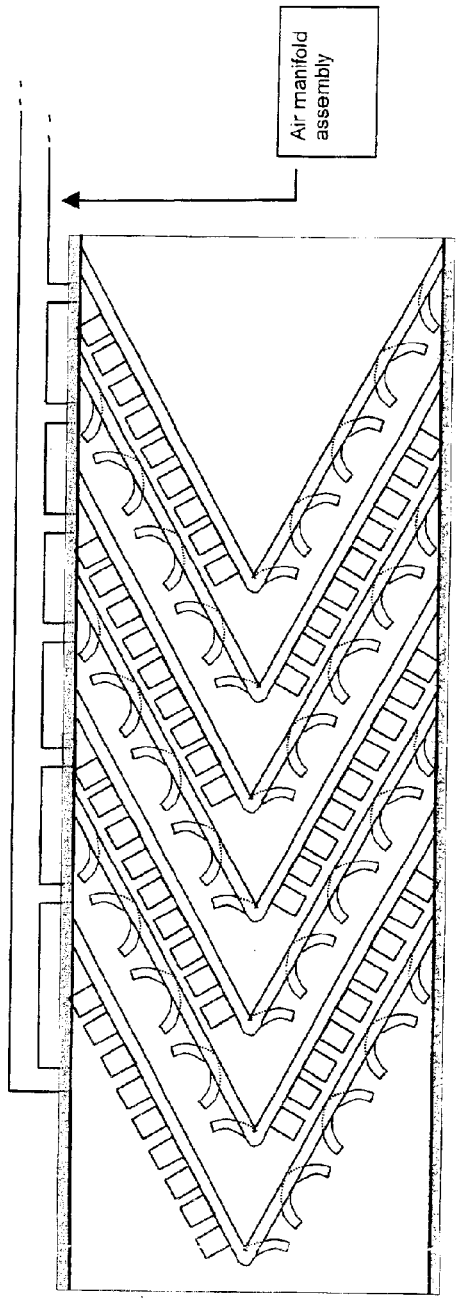
Fig. 1 - Side View Cross-Section
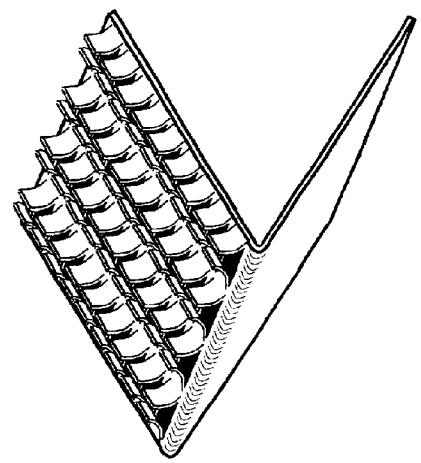
Fig. 3 – Angle view of baffle
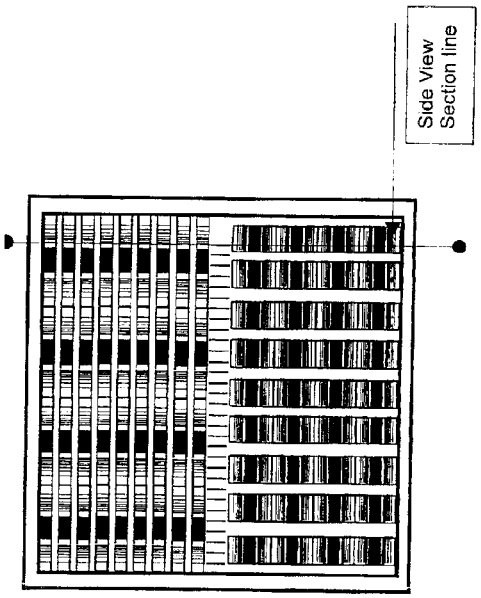
Fig. 2 - Front View

EXHAUST CATALYTIC CONVERTER/MUFFLER

CROSS REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERNCE OF MATERIAL SUBMITTED ON A COMPACT DISC

Not Applicable

BACKGROUND OF THE INVENTION

Exhaust gasses, the result of internal combustion within modem piston engines, contain certain compounds, which are treated by passing them through a catalytic converter, thereby rendering them more environmentally friendly. Such engines are typically fueled by gasoline, however diesel engines are also being adapted to such catalytic converter use.

A typical catalytic converter is a unit placed within the exhaust system, such that the stream of exhaust must pass through it. It is placed near the front of the exhaust system, close to the engine, as the higher exhaust heat is beneficial to the chemical reaction within the unit.

The physical design of today's catalytic converter has not changed much in over 20 years. It typically consists of a ceramic honeycomb region, the appearance of which may be compared to a large handful of drinking straws bound together, to which slurry containing a catalyst (a mixture of precious metals) is sintered. Many such units also contain a tube inlet, to allow externally pumped air to enter and "burn" off undesirable gasses. The exhaust simply flows through the many tubes within the ceramic base and reacts to the catalyst and extra oxygen brought in via the external air. The design offers a high surface area, as it is important to expose as much exhaust to catalyst as possible, in order to convert much of the incoming volume of exhaust.

BRIEF SUMMARY OF THE INVENTION

The proposed design abandons the familiar ceramic base with a series of perforated baffles, encased within a square tube. The square tube, in cross-section, offers more surface area than the conventional round cross-section of the remainder of a typical exhaust system. The cross-section may be modified to allow rectangular shapes, as needed by application. The baffles are to be constructed of stainless steel, and their size and number may also vary with application. They have the appearance of a rectangle, folded in half, forming a vee shape that may fit within a square tube. By using a folded rectangle, the surface area is effectively increased, reducing restriction to flow.

BRIEF DESCRIPTION OF THE SEVERAL VIEWS OF THE DRAWINGS

The objects of the invention may be further understood from the following descriptions given in connection with the accompanying drawings, in which:

FIG. 1 shows a cross-section of a square tube with a series of baffles, each oriented 180 degrees from each other. Note that this has the effect of flip-flopping the baffles, so that the passing gasses are always exposed to a variety of surfaces and are forced to flow around the baffle surface and flaps, ensuring that the passing volume of gas is exposed to much of the catalyst. It also shows an example of an air manifold tube, which can be used to introduce external air to the unit.

FIG. 2 shows a front view of the square tube, with the leftmost baffle in FIG. 1 showing. Due to the angles of the baffle, the slots appear to be foreshortened, however, the cross-section (FIG. 1) shows that the slots actually have a great amount of area, so as to not restrict flow. Note that the top half of this baffle has horizontal slots, and the bottom, vertical slots.

FIG. 3 shows an angled view of a rectangular baffle, intended for a square tube. This baffle shows the form in which the baffles are intended to take. The rectangular baffle is folded down its middle, to form a V-shape in profile. Note that one shape and size baffle is need for a given converter of this design, and that it's effectiveness can be increased by using many baffles, within the tube. The top surface also shows the type of perforating that is to be used. Each slot has its flaps bent upward, expose their surface area to passing gasses. The baffles themselves are intended to be plated or coated with the same industry standard catalyst as used currently.

DETAILED DESCRIPTION OF THE INVENTION

The baffles are perforated by a die in a way that the flaps of the created hole remain affixed at the edges. No metal is lost during the perforation process. This serves to increase the surface area, as it is intended that all surfaces of the baffle be plated with the same precious metals used as a catalyst in a conventional converter. The holes created, resemble slots, orientated horizontally on one half of the vee-shaped baffle, and vertically on the other.

By rotating the orientation of the baffle 180 degrees, every baffle in the tube will face a baffle that is upside down, compared to it. Gasses traveling through the tube, will first face slots orientated 90 degrees from the proceeding slots. This condition, in an addition to the fact the baffles' angled surfaces stagger as they are positioned within the tube guarantee that the gasses cannot simply travel straight through, but must swirl around the flaps and through slots, exposing as much gas volume as possible to the catalyst. This may also serve to muffle the exhaust, an added benefit. This design can easily be adapted to use an air tube, be leaving enough gap between two sets of baffles to allow the tube to be introduced. Additionally, an external manifold may be used to introduce air at every point between the baffles, thus having a small diameter tube connecting a hole in the side of the tube at a point between each baffle, to main tube, acting as the manifold collector.

This design offers an alternative to ceramic construction, by using stainless steel or other high temperature, easily worked metal, instead The use of sheet metal will allow the unit to beat up rapidly, allowing the catalytic reaction to work more efficiently. Quick heat up is crucial to emissions, as the catalytic compounds do not reach their peak operating efficiency until they are hot. This dilemma is particularly reduced in degree, by this design, in avoiding the high thermal inertia of ceramic.

The baffles may be welded in place, thus becoming a solid unit with the tube.

What is claimed is:

1. An exhaust catalytic converter/muffler consisting of a unit of dual functionality of purifying and muffling exhaust gasses, said unit consisting of:

a metallic housing in form of a square or rectangular tube; and a plurality of at least two folded, perforated metallic baffles affixed within said tube;

wherein each baffle is coated with catalytic material and positioned so that their apexes form a V shape pointing towards the end of the tube;

wherein each baffle contains perforations consisting of slots being oriented parallel to the fold-line of the apex on half of the baffle and perpendicular to the fold-line of the other half of the baffle; the slots having flaps extending outwardly for deflecting gasses traveling through the perforations in said baffles, thereby imparting a swirling motion to the passing gasses;

wherein each subsequent baffle is rotated 180 degrees relative to the one preceding it, allowing the gasses traveling through the tube to encounter the flaps of the slots being oriented either parallel or perpendicular to the fold-line of the apex until the gasses reach the end of the tube.

2. The exhaust catalytic converter/muffler of claim 1, wherein the folded baffles have the same dimensions.

* * * * *